Nov. 29, 1927.  
C. B. EMERY  
1,651,019  
ELECTRICAL CIRCUIT CONNECTING DEVICE  
Filed Feb. 9, 1924
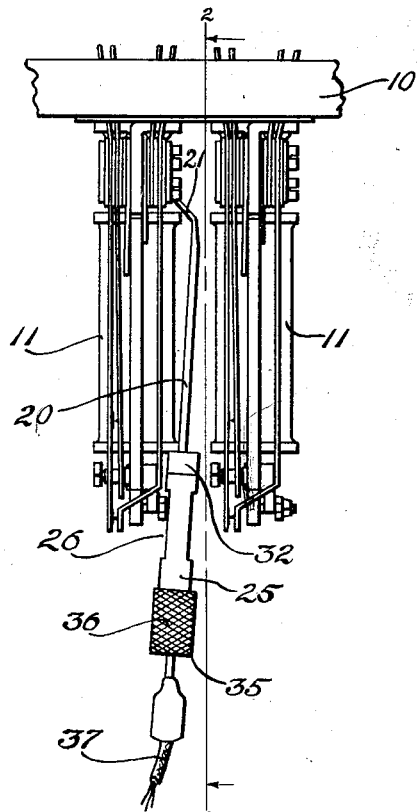
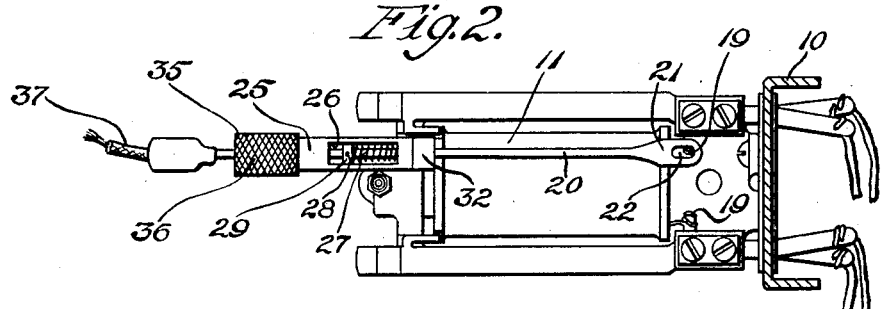
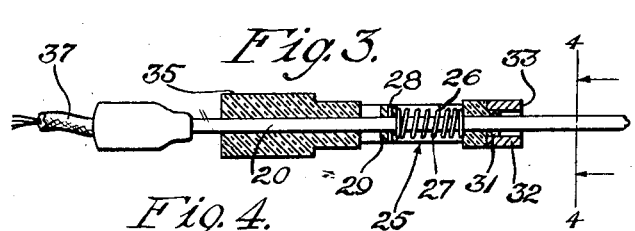
Inventor  
Charles B. Emery  
by H. O. Pattison  
Atty.

Patented Nov. 29, 1927.

1,651,019

UNITED STATES PATENT OFFICE.

CHARLES BREVET EMERY, OF RIVER FOREST, ILLINOIS, ASSIGNOR TO WESTERN ELECTRIC COMPANY, INCORPORATED, OF NEW YORK, N. Y., A CORPORATION OF NEW YORK.

ELECTRICAL-CIRCUIT-CONNECTING DEVICE.

Application filed February 9, 1924. Serial No. 691,555.

This invention relates to electrical circuit connecting devices, and more particularly to a device for engaging relatively inaccessible terminals or contacts of relays, or other electrical devices.

In telephone exchange equipments the mechanism is compactly arranged to conserve space and includes electromagnetic devices commonly known as relays, which may be closely mounted in vertical and horizontal arrangement, making it difficult to contact with the winding contacts thereof to close a circuit therethrough for testing and adjustment purposes.

An object of this invention is to provide a device for readily extending to an accessible point, a relatively inaccessible winding contact or terminal of a relay of the before mentioned type, whereby a circuit therethrough may be readily closed for testing purposes.

Another object of the invention is to provide a device of this type with means to prevent its displacement during operation.

A further object of the invention is to provide a device of the above mentioned type, which is of simplified construction, practical and efficient.

A device made in accordance with the invention may comprise a rod provided with a contacting end suitably formed for engaging different shaped terminals, the rod also being adapted to be connected by a suitable conductor to a source of current supply, or a suitable electric circuit. Surrounding the rod a sleeve, preferably composed of insulating material and provided with a knurled inner end face, is pressed by a spring associated therewith against the head of the relay, maintaining the engaging end of the rod against the engaged terminal or contact of the relay.

These and other features of the invention not specifically mentioned will clearly appear from the following description and the accompanying drawings, in which Fig. 1 is a plan view of a testing device embodying the features of the invention shown in operative position upon a relay forming part of a telephone exchange equipment;

Fig. 2 is a section upon the line 2—2 thereof;

Fig. 3 is an enlarged fragmentary view partly in section of the device, and

Fig. 4 is a section upon the line 4—4 thereof.

In the drawings, 10 indicates a horizontally disposed bar or plate forming a portion of the framework in a telephone exchange. A series of similar plates (not shown) may be positioned above and below the plate 10, and upon such plate there may be closely mounted by any suitable means in a horizontal arrangement, as shown in the drawings, a plurality of electro-magnetic devices 11, commonly called relays. After assembling the relays on the plate 10, and during the inspection, testing and setting of the equipment, it may be necessary to determine whether the contact springs and armature of the relay are properly adjusted. During such testing it is desirable that the circuit through the winding of the relay be closed.

In the embodiment of the invention shown, which is devised particularly for engaging a terminal 19 of the relay 11, a rod 20, preferably made of bronze, is provided at one end with an offset portion 21 which forms the terminal engaging end of the device. As best shown in Fig. 2 the portion 21 is provided with an elongated opening or slot 22 extending in the direction of the length of the rod 20, into which the terminal 19 is entered when mounting the device in operative position upon the relay. Slidably mounted upon the rod 20 is a sleeve 25 made from phenol fibre, or other suitable insulating material, provided with a slot 26. Between the ends of the slot 26 and carried upon the rod 20 is a compression spring 27 and secured by a pin 28 to the rod 20 is a nutlike member 29 provided with flat sides, which when the device is in its inoperative position rests against the end of the slot 26 to limit the movement of the rod 20 relative to the sleeve 25. The flat sides of the member 29 riding in the slot 26 prevent relative rotation of the sleeve 25 and the rod 20. The action of the spring 27 tends to move the sleeve 25 upon the rod 20 toward the offset portion 21 of the rod. The sleeve 25 at its end nearest the offset portion is provided with a reduced portion 31, over which is secured by a drive fit, a bronze sleeve 32, the outside end of which is knurled as indicated at 33 to provide an anti-slipping surface to prevent the displacement of the device when positioned upon the relay as indicated in Fig. 1. When in its operative position, as indicated in Fig. 2, the knurled end 33 of the spring pressed sleeve 25 is pressed against the outside head of the relay 11 with the terminal 19 pressed against the outside end of the slot 22 as clearly shown in Fig. 2. There is a tendency of the sleeve 25 to slip off the head of the relay, which is prevented by the knurled end 33. The outside end of the sleeve 25 is slightly enlarged in diameter as indicated at 35 and its peripheral surface is knurled as indicated at 36 to form a hand grip for operating the sleeve when mounting the device in position on the relay. The end of the rod 20 opposite the offset end has suitably secured thereto a conductor 37 which is connected to a suitable source of current supply.

In using the circuit closing device, a device with a suitably formed contacting end adapted to be used with the particular type of relay and contact thereof to be engaged is first chosen. The contacting end of the rod 20 is first moved into the space between a pair of relays and then hooked over the terminal 19 of the relay 11, after which the sleeve 25 is moved forward on the rod against the action of the spring 27 by gripping the handle portion 35 of the sleeve and pulling forward until the knurled end 33 of the bronze sleeve 32 is outside of the head of the relay. By moving the device slightly to the right and releasing the handle 35, the sleeve 25 will move back on the rod, due to the action of the spring 27, and rest against the head of the relay as clearly shown in Figs. 1 and 2. In this position with the conductor 37 connected to a source of current supply, a circuit through the winding of the relay will be closed. With the device mounted in this position one tester may test and adjust the contact springs and armatures from one side of a relay.

The above described device provides an efficient means for extending to an accessible point a contact or terminal of an electrical device, which due to its being mounted in operative position, is not accessible to ordinary means.

What is claimed is:

1. In an electrical circuit connecter, a metal rod having an apertured end portion for engaging an electrical terminal of an electrical device, an insulating handle slidably mounted upon the rod and having a longitudinal slot therein, a collar secured upon the rod within and having flat sides engaging the side walls of the slot for preventing relative rotation between the handle and the rod, a compression spring surrounding the rod within and having one end thereof engaging one end wall of the slot and the other end thereof engaging the collar to maintain the apertured end portion of the rod in engagement with the terminal and the handle in engagement with the device at a point removed from the terminal.

2. In an electrical circuit connecter, a metal rod having a flattened offset portion provided with an elongated opening having continuous walls for engaging an electrical terminal of electrical apparatus having portions projecting beyond the terminal and preventing access thereto in a straight line path, an insulating sleeve slidably mounted upon the rod, a spring surrounding the rod within the sleeve and one end thereof engaging the sleeve, means secured to the rod in engagement with the other end of the spring and co-operating therewith to normally maintain the rod and the sleeve in a predetermined longitudinal relationship, and means attached to the sleeve for engaging one of the projecting portions of the apparatus under the pressure of the spring and co-operating with the wall of the elongated opening in the rod to maintain the rod in engagement with the terminal.

In witness whereof, I hereunto subscribe my name this 25th day of January, A. D., 1924.

CHARLES BREVET EMERY.